(12) United States Patent
Yamaguchi et al.

(10) Patent No.: US 8,420,164 B2
(45) Date of Patent: Apr. 16, 2013

(54) SOLID TYPE RUBBER-BASED PRESSURE-SENSITIVE ADHESIVE COMPOSITION AND PRESSURE-SENSITIVE ADHESIVE SHEET THEREOF

(75) Inventors: Tomoo Yamaguchi, Ibaraki (JP); Yasunobu Ina, Ibaraki (JP); Tomoaki Uchiyama, Ibaraki (JP); Minoru Yagi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 511 days.

(21) Appl. No.: 12/305,402

(22) PCT Filed: Jul. 2, 2007

(86) PCT No.: PCT/JP2007/063237
§ 371 (c)(1),
(2), (4) Date: Dec. 18, 2008

(87) PCT Pub. No.: WO2008/004519
PCT Pub. Date: Jan. 10, 2008

(65) Prior Publication Data
US 2010/0040777 A1 Feb. 18, 2010

(30) Foreign Application Priority Data

Jul. 3, 2006 (JP) .................. 2006-183161
Jun. 21, 2007 (JP) .................. 2007-163420

(51) Int. Cl.
*C09J 133/08* (2006.01)
*B05D 5/10* (2006.01)

(52) U.S. Cl.
USPC ............... 427/208.4; 427/208.2; 524/560; 525/329.7; 156/327

(58) Field of Classification Search ............... 427/208.2, 427/208.4; 524/560; 525/329.7; 156/327
See application file for complete search history.

(56) References Cited

U.S. PATENT DOCUMENTS

| 4,181,752 | A * | 1/1980 | Martens et al. ............... 427/516 |
| 2001/0006723 | A1 * | 7/2001 | Yamaguchi et al. .......... 428/336 |
| 2004/0016504 | A1 * | 1/2004 | Mitarai ........................ 156/247 |
| 2004/0110905 | A1 * | 6/2004 | Kubota et al. ............... 525/329.7 |
| 2004/0260007 | A1 | 12/2004 | Yamaguchi et al. |

FOREIGN PATENT DOCUMENTS

| CN | 1303898 A | 7/2001 |
| JP | 59-45705 B2 | 11/1984 |
| JP | 62-263273 A | 11/1987 |
| JP | 02-194081 A | 7/1990 |
| JP | 02-252751 | * 10/1990 |
| JP | 4-110377 A | 4/1992 |
| JP | 2600360 B2 | 1/1997 |
| JP | 2600361 B2 | 1/1997 |
| JP | 2001-181596 A | 7/2001 |
| JP | 2005-008747 A | 1/2005 |
| JP | 2005-82775 A | 3/2005 |

OTHER PUBLICATIONS

Office Action issued Dec. 15, 2010 in counterpart Chinese Application No. 200780024099.7.
Chinese Office Action dated Jan. 8, 2010 in Chinese Application No. 2007800240997.
Extended European Search Report issued on Nov. 29, 2010 in the corresponding European Patent Application No. 07768012.2.
Office Action dated Jun. 15, 2011 from the State Intellectual Property Office of P.R. China in counterpart application No. 200780024099.7.
Notification of Refusal dated Jun. 21, 2012 issued in counterpart Japanese Patent Application No. 2007163420.
Communication dated Dec. 24, 2012 from the Korean Intellectual Property Office in a counterpart application No. 10-2009-7000043.

* cited by examiner

*Primary Examiner* — Randy Gulakowski
*Assistant Examiner* — Kara Boyle
(74) *Attorney, Agent, or Firm* — Sughrue Mion, PLLC

(57) ABSTRACT

The present invention relates to a solid type rubber-based pressure-sensitive adhesive composition, which is prepared by adding a tackifier, a softener, and an isocyanate-based crosslinking agent reactable with active hydrogen into an acrylic rubber containing a monomer having an active hydrogen-containing functional group as a copolymerization component to thereby obtain a solventless and nonaqueous pressure-sensitive adhesive composition, and particularly it relates to a solid type rubber-based pressure-sensitive adhesive composition having the above-mentioned constitution, in which the above-mentioned acrylic rubber includes a copolymer containing butyl acrylate as a main component, and as the copolymerization component a monomer having a hydroxyl group or a carboxyl group as the active hydrogen-containing functional group.

6 Claims, No Drawings

SOLID TYPE RUBBER-BASED PRESSURE-SENSITIVE ADHESIVE COMPOSITION AND PRESSURE-SENSITIVE ADHESIVE SHEET THEREOF

TECHNICAL FIELD

The present invention relates to a solid type rubber-based pressure-sensitive adhesive composition and a pressure-sensitive adhesive sheet obtained by applying the same on a substrate.

BACKGROUND ART

A solid type rubber-based pressure-sensitive adhesive composition is prepared by using a rubber as a main polymer, and mixing a tackifier and the like therewith, followed by kneading to give a solid type rubber-based pressure-sensitive adhesive composition, and it is applied on a substrate to produce a pressure-sensitive adhesive sheet.

The solid type rubber-based pressure-sensitive adhesive composition which is used in this process is a solventless and nonaqueous pressure-sensitive adhesive composition using neither any organic solvent which causes environmental pollution nor water which necessitates much energy for drying. Usually, a rubbery polymer including natural rubber is used as a base compound, a tackifier is mixed therewith, and a filler such as a fine calcium carbonate powder, a softener such as an oil, an antioxidant and the like are mixed therewith in appropriate amounts. This mixture is kneaded by a batch-type kneader such as a pressure kneader, a Banbury mixer or mixing roll, or a continuous kneader such as a twin-screw extruder, with heating to obtain a pressure-sensitive adhesive composition which is solid at ordinary temperature.

However, although nonpolar rubbers such as a natural rubber, a butyl rubber or a styrene-butadiene rubber have often been used in the rubber-based pressure-sensitive adhesive composition and they have an excellent adhesive performance, they are unusable for heat-resistant uses at 100° C. or higher, resulting in a failure to pioneer the heat-resistant uses.

On the other hand, patent documents 1 and 2 describe that for a pressure-sensitive adhesive for surface protective film, an acrylic rubber is used as a base compound, and that a methylol compound as a crosslinking agent or a methylol compound and a multifunctional isocyanate as crosslinking agents are mixed therewith to allow the above-mentioned crosslinking agent(s) to conduct a crosslinking reaction with functional groups allowed to be contained in the acrylic rubber, thereby achieving an effect of improving weather resistance of the pressure-sensitive adhesive or inhibiting deterioration with time of adhesive strength after storage at high temperatures for a long period of time.

Patent Document 1: Japanese Patent No. 2600360
Patent Document 2: Japanese Patent No. 2600361

DISCLOSURE OF THE INVENTION

According to the pressure-sensitive adhesives proposed above, it becomes possible to pioneer the heat-resistant uses by using the acrylic rubber as a base compound and allowing it to crosslink. However, this is of an organic solvent dissolution type, similarly to general acrylic pressure-sensitive adhesives, so that it is necessary to use an organic solvent which causes environmental pollution in large amounts. Further, there has also been a problem that one reduced in viscosity can only be thinly applied.

As the acrylic pressure-sensitive adhesive, an emulsion type one is known. However, it necessitates much energy for drying after application to a substrate. Further, one reduced in viscosity can only be thinly applied, similarly to the organic solvent dissolution type one. Moreover, although a hot melt type one has recently been known, it is one obtained by polymerizing a monomer, and control of pressure-sensitive adhesive properties with a tackifier or the like has not been achieved yet, resulting in being expensive to limit its use.

In view of such circumstances, an object of the invention is to provide a rubber-based pressure-sensitive adhesive composition which is solid at ordinary temperatures, and is a solventless, nonaqueous pressure-sensitive adhesive composition excellent in heat resistance and durability, satisfying adhesive strength and high-temperature holding power, using neither any organic solvent which causes environmental pollution nor water which necessitates much energy for drying, and easily coatable by heating to be able to arbitrarily set the adhesive thickness from thin to thick depending on its use, by using an acrylic rubber as a base compound, and to provide a pressure-sensitive adhesive sheet using the same.

In order to attain the above-mentioned object, the present inventors have made intensive studies. As a result, it has been found that a rubber-based pressure-sensitive adhesive composition which is solid at ordinary temperatures, which is excellent in heat resistance and durability, satisfies adhesive strength and high-temperature holding power, uses neither any organic solvent which is environmental pollution nor water which necessitates much energy for drying, and is easily coatable by heating to be able to arbitrarily set the adhesive thickness from thin to thick depending on its use, is obtained as a solventless and nonaqueous pressure-sensitive adhesive composition by using an acrylic rubber containing a monomer having an active hydrogen-containing functional group as a copolymerization component and adding thereto a tackifier, a softener and an isocyanate-based crosslinking agent reactable with active hydrogen, followed by kneading, and that a pressure-sensitive adhesive sheet using the same is also obtained thereby, thus leading to completion of the invention.

Namely, the invention relates to the following (1) to (8):

(1) A solid type rubber-based pressure-sensitive adhesive composition, which is prepared by adding a tackifier, a softener, and an isocyanate-based crosslinking agent reactable with active hydrogen into an acrylic rubber containing a monomer having an active hydrogen-containing functional group as a copolymerization component to thereby obtain a solventless and nonaqueous pressure-sensitive adhesive composition.

(2) The solid type rubber-based pressure-sensitive adhesive composition according to (1), in which the acrylic rubber includes a copolymer containing butyl acrylate as a main component, and as the copolymerization component a monomer having a hydroxyl group or a carboxyl group as the active hydrogen-containing functional group.

(3) The solid type rubber-based pressure-sensitive adhesive composition according to (1) or (2), in which the composition includes 5 to 150 parts by weight of the tackifier, 5 to 80 parts by weight of the softener, and 0.1 to 20 parts by weight of the isocyanate-based crosslinking agent, based on 100 parts by weight of the acrylic rubber.

(4) A pressure-sensitive adhesive sheet including a substrate and a layer including the solid type rubber-based pressure-sensitive adhesive composition according to any one of (1) to (3), the layer being provided on the substrate.

(5) A method for producing a solid type rubber-based pressure-sensitive adhesive composition, the method including:

adding a tackifier, a softener and an isocyanate-based crosslinking agent reactable with active hydrogen to an acrylic rubber containing a monomer having an active hydrogen-containing functional group as a copolymerization component, followed by kneading them, thereby producing a solventless and nonaqueous pressure-sensitive adhesive composition.

(6) The method for producing a solid type rubber-based pressure-sensitive adhesive composition according to (5), in which the acrylic rubber includes a copolymer containing butyl acrylate as a main component, and as the copolymerization component a monomer having a hydroxyl group or a carboxyl group as the active hydrogen-containing functional group.

(7) The method for producing a solid type rubber-based pressure-sensitive adhesive composition according to (5) or (6), in which the composition includes 5 to 150 parts by weight of the tackifier, 5 to 80 parts by weight of the softener, and 0.1 to 20 parts by weight of the isocyanate-based crosslinking agent, based on 100 parts by weight of the acrylic rubber.

(8) A method for producing a pressure-sensitive adhesive sheet, the method including applying the solid type rubber-based pressure-sensitive adhesive composition produced by the method according to any one of (5) to (7) on a substrate under heating.

Incidentally, in the invention (the present specification), the term "pressure-sensitive adhesive sheet" implies not only a pressure-sensitive adhesive sheet usually having a wide width, but also a pressure-sensitive adhesive tape usually having a narrow width, and further widely implies various conventional pressure-sensitive adhesive products such as a pressure-sensitive adhesive label.

As described above, the rubber-based pressure-sensitive adhesive composition of the invention includes the acrylic rubber as the base component and is solid at ordinary temperatures. Therefore, the pressure-sensitive adhesive sheet excellent in heat resistance and durability and satisfying adhesive strength and high-temperature holding power can be produced by crosslinking treatment of such pressure-sensitive adhesive composition. Further, since it is softened by heating to be easily formable, coating on the substrate is possible without using any organic solvent or water, the adhesive thickness thereof can be arbitrarily set. Furthermore, no drying process is required after the coating on the substrate because of no use of organic solvent or water, which can contribute to saving of energy and is also desirable for the global environment.

BEST MODE FOR CARRYING OUT THE INVENTION

In the invention, the acrylic rubber is a high-molecular weight rubbery elastomer which is obtained by using an acrylate such as butyl acrylate, ethyl acrylate or methoxyethyl acrylate as a main component and a monomer having an active hydrogen-containing functional group as a copolymerization component, and copolymerizing these monomers by an emulsion polymerization method or the like, and one having a Mooney viscosity ($ML_{1+4}$, 100° C.) of 28 to 65 is generally used.

In this acrylic rubber, the monomer having the active hydrogen-containing functional group constitutes crosslinking points for conducting a crosslinking reaction with the isocyanate-based crosslinking agent, and is generally used in an amount of 1 to 20% by weight based on the total amount of the acrylate as the main component.

Of such acrylic rubbers, a high-molecular weight rubbery elastomer including a copolymer in which butyl acrylate is used as the main component and a monomer having a hydroxyl group or a carboxyl group as the active hydrogen-containing functional group is particularly preferably used as the copolymerization component.

As the monomer having a hydroxyl group or a carboxyl group as the active hydrogen-containing functional group, there can be used any one of various conventional monomers having each functional group. Specifically, examples of the hydroxyl group-containing monomers include hydroxyalkyl (meth)acrylates such as hydroxyethyl methacrylate, and the like. Further, the carboxyl group-containing monomers include (meth)acrylic acid and the like.

In the invention, there is no particular limitation on the tackifier, as long as it has excellent compatibility with the acrylic rubber, namely, it has an SP value which is close to that of the acrylic rubber, and any conventional one can be widely used. Specific examples thereof include a terpene-phenol resin, a rosin ester resin, a cumarone-indene resin, a styrene resin and the like.

These tackifiers are used generally in an amount of 5 to 150 parts by weight, preferably 50 to 100 parts by weight, based on 100 parts by weight of the acrylic rubber.

In the invention, there is no particular limitation on the softener, as long as it has excellent compatibility with the acrylic rubber, and any conventional one can be widely used. Specific examples thereof include an adipic acid-based ether ester, an adipic acid-based polyester, a polyether ester, an aliphatic acid alkyl ester and the like. Further, of the tackifiers, since ones which are liquid at ordinary temperatures also have a function as a softener, they are treated as the softener. These softeners are used generally in an amount of 5 to 80 parts by weight, preferably 10 to 30 parts by weight, based on 100 parts by weight of the acrylic rubber.

In the invention, the isocyanate-based crosslinking agent may be any, as long as it has an isocyanate group reactable with active hydrogen. Specific examples thereof include a lower aliphatic acid, an alicyclic or aromatic polyisocyanate, an isocyanate adduct of a polyhydric alcohol and the like.

Such isocyanate-based crosslinking agents are used generally in an amount of 0.1 to 20 parts by weight, preferably 0.5 to 5 parts by weight, based on 100 parts by weight of the acrylic rubber.

In the invention, the above-mentioned tackifier, softener and isocyanate-based crosslinking agent reactable with active hydrogen were added in series to the above-mentioned acrylic rubber, followed by kneading, thereby producing a rubber-based pressure-sensitive adhesive composition which is solid at ordinary temperatures. Since neither any organic solvent which causes environmental pollution nor water which necessitates much energy for drying is used in kneading, the composition of the invention is friendly to the global environment and desirable also in respect to energy saving.

Further, when the crosslinking agent is added and kneaded, the crosslinking agent is allowed to be uniformly dispersed in the composition, and concurrently allowed to uniformly react with the active hydrogen-containing functional groups as the crosslinking points of the acrylic rubber. The pressure sensitive adhesive composition having a structure in which crosslinking treatment is performed to the acrylic rubber to a moderate degree is obtained by this crosslinking reaction.

The kneading can be performed by using a batch-type kneader such as a pressure kneader, a Banbury mixer or mixing roll, or a continuous kneader such as a twin-screw extruder. In that case, the kneading temperature is appropriately selected within the range of about 100 to 200° C. depending on the viscosity of the acrylic rubber and the like.

The kneading time is set depending on the kneading temperature within such a range that the total kneading time of the respective components becomes 3 to 60 minutes, while observing the torque at the time of kneading. Further, in the kneading at the time when the crosslinking agent is added, there are selected such conditions that cleavage of crosslinked structure portions due to the crosslinking reaction does not occur.

Incidentally, in the above-mentioned kneading, a filler such as calcium carbonate, talc or magnesium oxide may be added as an optional component in an amount of 200 parts by weight or less based on 100 parts by weight of the acrylic rubber, followed by kneading, according to the necessity.

Further, various conventional antioxidants may be added in an amount of 5 parts by weight or less based on 100 parts by weight of the acrylic rubber, followed by kneading. In addition, conventional plasticizers and various additives may be added, followed by kneading.

The solid type rubber-based pressure-sensitive adhesive composition having such a crosslinked structure has excellent formability that it is easily softened upon heating thereof, so that it is applied on a substrate such as cloth, paper, a plastic film, a nonwoven fabric or a woven fabric under heating, thereby being able to produce the pressure-sensitive adhesive sheet having a layer composed of the above-mentioned rubber-based pressure-sensitive adhesive composition on the substrate.

Here, the coating under heating can be performed using a calender roll, an extruder or the like, and the adhesive thickness can be arbitrarily set to as thin as 0.05 mm to as thick as 3 mm. Namely, the adhesive thickness can be arbitrarily set within the wide range of 0.05 to 3 mm, depending on the use. Moreover, in that case, since the pressure-sensitive adhesive composition is solventless and nonaqueous, there is no problem of environmental pollution to be friendly to the global environment. Moreover, no heating process is required, which greatly contributes to energy saving.

The pressure-sensitive adhesive sheet of the invention thus produced is excellent in heat resistance and durability, and satisfies adhesive strength and holding power, particularly, high-temperature holding power. A decrease in holding power at the time when it is allowed to stand at high temperatures is scarcely observed. Accordingly, it can be widely used for various uses requiring high-temperature adhesion and durability as a single-sided or double-sided pressure-sensitive adhesive sheet.

EXAMPLES

The invention will be explained below in more detail by reference to examples thereof. However, the invention should not be construed as being limited to the following examples. In the following description, "parts" means "parts by weight".

Example 1

Into a 3-liter pressure kneader heated at 150° C., 1,500 g of an acrylic rubber (Mooney viscosity (ML1+4, 100° C):30) including a copolymer of 95 parts of butyl acrylate and 5 parts of acrylic acid was introduced, and kneaded for 2 minutes. Then, 750 g of a terpene-phenol resin ("Mighty Ace G125" manufactured by Yasuhara Chemical Co., Ltd.) was introduced in several batches thereinto as a tackifier, followed by kneading for about 15 minutes. Further, 300 g of a polyether ester ("ADK CIZER RS735" manufactured by ADEKA Co., Ltd.) was introduced in several batches thereinto as a softener, followed by kneading for about 15 minutes.

Finally, 30 g of an isocyanate-based crosslinking agent ("Coronate HX manufactured by Nippon Polyurethane Industry Co., Ltd.) was introduced thereinto as a crosslinking agent, followed by kneading for about 5 minutes. Then, the resulting product was taken out of the kneader to prepare a solid type rubber-based pressure-sensitive adhesive composition.

Subsequently, this solid type rubber-based pressure-sensitive adhesive composition was applied on a substrate (back-treated polyester film having a thickness of 38 μm) with heating at 150° C. to an adhesive thickness of 0.05 mm, using an extruder having a diameter of 25 mm, thereby preparing a pressure-sensitive adhesive sheet.

For this pressure-sensitive adhesive sheet, an adhesive strength test and a holding power test were performed by the following methods. As a result, the adhesive strength (23° C.) was 7.5 N/25 mm, and the holding power (80° C.) was 0.1 mm in the shear distance thereof. This sheet satisfied the adhesive strength and the high-temperature holding power.

Adhesive Strength Test

A stainless-steel plate was used as an adherend, and a pressure-sensitive adhesive sheet having a width of 25 mm was adhered thereto under a load of 2 kg and peeled off at a peel angle of 180 degrees and a peel rate of 300 mm/min at a temperature of 23° C. The adhesive strength (N/25 mm width) at this time was measured.

Holding Power Test

A stainless-steel plate was used as an adherend, and a pressure-sensitive adhesive sheet having a size of 25 mm×25 mm was adhered thereto. In an atmosphere of 60° C., a static load of 500 g was perpendicularly applied to one end of the pressure-sensitive adhesive sheet, and the shear distance (mm) of the pressure-sensitive adhesive sheet after 60 minutes was measured.

Example 2

Into a 3-liter pressure kneader heated at 130° C., 1,500 g of an acrylic rubber (Mooney viscosity ($ML_{1+4}$, 100° C.):30) including a copolymer of 70 parts of butyl acrylate, 30 parts of ethyl acrylate and 5 parts of hydroxyethyl acrylate was introduced, and kneaded for 2 minutes. Then, 750 g of a terpene-phenol resin ("Mighty Ace K125" manufactured by Yasuhara Chemical Co., Ltd.) was introduced in several batches thereinto as a tackifier, followed by kneading for about 10 minutes. Further, 300 g of an acrylic polymer tackifier ("Arufon UP1000" manufactured by Toagosei Co., Ltd.) was introduced in several batches thereinto as a softener, followed by kneading for about 10 minutes.

Finally, 30 g of an isocyanate-based crosslinking agent ("Coronate HX manufactured by Nippon Polyurethane Industry Co., Ltd.) was introduced thereinto as a crosslinking agent, followed by kneading for about 2 minutes. Then, the resulting product was taken out of the kneader to prepare a solid type rubber-based pressure-sensitive adhesive composition.

Subsequently, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 22 N/25 mm width, and the holding power (80° C.) was 0.15 mm in the shear distance thereof. This sheet satisfied the adhesive strength and the high-temperature holding power.

Example 3

Into a 3-liter pressure kneader heated at 130° C., 1,500 g of an acrylic rubber (Mooney viscosity (ML1+4, 100° C):30) including a copolymer of 95 parts of butyl acrylate and 5 parts of hydroxyethyl acrylate was introduced, and kneaded for 2 minutes. Then, 750 g of a terpene-phenol resin ("YP90L" manufactured by Yasuhara Chemical Co., Ltd.) was introduced in several batches thereinto as a tackifier, followed by kneading for about 10 minutes. Further, 150 g of a polyether ester ("ADK CIZER RS735" manufactured by ADEKA Co., Ltd.) was introduced in several batches thereinto as a softener, followed by kneading for about 10 minutes.

Finally, 7.5 g of an isocyanate-based crosslinking agent ("Coronate HX manufactured by Nippon Polyurethane Industry Co., Ltd.) was introduced thereinto as a crosslinking agent, followed by kneading for about 2 minutes. Then, the resulting product was taken out of the kneader to prepare a solid type rubber-based pressure-sensitive adhesive composition.

Subsequently, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 10 N/25 mm width, and the holding power (80° C.) was 0.15 mm in the shear distance thereof. This sheet satisfied the adhesive strength and the high-temperature holding power.

Example 4

Into a 3-liter pressure kneader heated at 130° C., 1,500 g of an acrylic rubber (Mooney viscosity ($ML_{1+4}$, 100° C.):30) including a copolymer of 95 parts of butyl acrylate and 5 parts of hydroxyethyl acrylate was introduced, and kneaded for 2 minutes. Then, 1,050 g of a terpene-phenol resin ("YP90L" manufactured by Yasuhara Chemical Co., Ltd.) was introduced in several batches thereinto as a tackifier, followed by kneading for about 10 minutes. Further, 150 g of a xylenic resin ("Nikanol Y-1001" manufactured by Fudow Co., Ltd.) was introduced in several batches thereinto as a softener, followed by kneading for about 10 minutes.

Finally, 15 g of an isocyanate-based crosslinking agent ("Coronate HX manufactured by Nippon Polyurethane Industry Co., Ltd.) was introduced thereinto as a crosslinking agent, followed by kneading for about 2 minutes. Then, the resulting product was taken out of the kneader to prepare a solid type rubber-based pressure-sensitive adhesive composition.

Subsequently, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 19.5 N/25 mm width, and the holding power (80° C.) was 0.55 mm in the shear distance thereof. This sheet satisfied the adhesive strength and the high-temperature holding power.

Example 5

Into a 3-liter pressure kneader heated at 130° C., 1,250 g of an acrylic rubber (Mooney viscosity ($ML_{1+4}$, 100° C.):30) including a copolymer of 95 parts of butyl acrylate and 5 parts of hydroxyethyl acrylate was introduced, and kneaded for 2 minutes. Then, 1,250 g of a terpene-phenol resin ("YP90L" manufactured by Yasuhara Chemical Co., Ltd.) was introduced in several batches thereinto as a tackifier, followed by kneading for about 10 minutes. Further, 125 g of a xylenic resin ("Nikanol Y-1001" manufactured by Fudow Co., Ltd.) was introduced in several batches thereinto as a softener, followed by kneading for about 10 minutes.

Finally, 12.5 g of an isocyanate-based crosslinking agent ("Coronate HX manufactured by Nippon Polyurethane Industry Co., Ltd.) was introduced thereinto as a crosslinking agent, followed by kneading for about 2 minutes. Then, the resulting product was taken out of the kneader to prepare a solid type rubber-based pressure-sensitive adhesive composition.

Subsequently, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 21 N/25 mm width, and the holding power (80° C.) was 1.2 mm in the shear distance thereof. This sheet satisfied the adhesive strength and the high-temperature holding power.

Example 6

Into a 3-liter pressure kneader heated at 130° C., 1,000 g of an acrylic rubber (Mooney viscosity (ML1+4, 100° C):30) including a copolymer of 95 parts of butyl acrylate and 5 parts of hydroxyethyl acrylate was introduced, and kneaded for 2 minutes. Then, 2,000 g of calcium bicarbonate (manufactured by Maruo Calcium Co., Ltd.) was introduced in several batches thereinto as a filler, followed by kneading for about 5 minutes. Successively, 700 g of a terpene-phenol resin ("Mighty Ace G125" manufactured by Yasuhara Chemical Co., Ltd.) was introduced in several batches thereinto as a tackifier, followed by kneading for about 10 minutes. Further, 300 g of a polyether ester ("ADK CIZER RS735" manufactured by ADEKA Co., Ltd.) was introduced in several batches thereinto as a softener, followed by kneading for about 10 minutes.

Finally, 10 g of an isocyanate-based crosslinking agent ("Coronate HX manufactured by Nippon Polyurethane Industry Co., Ltd.) was introduced thereinto as a crosslinking agent, followed by kneading for about 2 minutes. Then, the resulting product was taken out of the kneader to prepare a solid type rubber-based pressure-sensitive adhesive composition.

Subsequently, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 7 N/25 mm width, and the holding power (80° C.) was 0.25 mm in the shear distance thereof. This sheet satisfied the adhesive strength and the high-temperature holding power.

Comparative Example 1

A solid type rubber-based pressure-sensitive adhesive composition was prepared in the same manner as in Example 1 with the exception that the crosslinking agent was not introduced. Further, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 8.5 N/25 mm width, and the holding power (80° C.) was 8.5 mm in the shear distance thereof. This sheet was significantly inferior in the high-temperature holding power.

Comparative Example 2

An organic solvent dissolution type pressure-sensitive adhesive composition obtained by radically copolymerizing 95 parts of butyl acrylate and 5 parts of acrylic acid in toluene to obtain a copolymer, adjusting the solid content to 25% by weight, and mixing 2 parts of the isocyanate-based crosslinking agent (the same one as in Example 1) therewith was applied on the substrate (the same polyester film as in Example 1) to an adhesive thickness of 0.05 mm by a reverse coating machine, and then, dried by heating to prepare a pressure-sensitive adhesive sheet.

For this pressure-sensitive adhesive sheet, the adhesive strength test and the holding power test were performed in the same manner as in Example 1. As a result, the adhesive strength (23° C.) was 14.0 N/25 mm width, and the holding power (80° C.) was 0.6 mm in the shear distance thereof.

Comparative Example 3

A solid type rubber-based pressure-sensitive adhesive composition was prepared in the same manner as in Example 4 with the exception that the crosslinking agent was not introduced. Further, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 23.0 N/25 mm width, and the holding power (80° C.) was "drop" after about 5 minutes. This sheet was significantly inferior in the high-temperature holding power.

Comparative Example 4

A solid type rubber-based pressure-sensitive adhesive composition was prepared in the same manner as in Example 5 with the exception that the crosslinking agent was not introduced. Further, using this solid type rubber-based pressure-sensitive adhesive composition, a pressure-sensitive adhesive sheet was prepared in the same manner as in Example 1.

For this pressure-sensitive adhesive sheet, the adhesive strength test and the holding power test were performed in the same manner as in Example 1. As a result, the adhesive strength (23° C.) was 20.0 N/25 mm width, and the holding power (80° C.) was "drop" after about 1 minute. This sheet was significantly inferior in the high-temperature holding power.

As is clear from the results of Examples 1 to 6 and Comparative Example 1 to 4 described above, in Examples 1 to 6 of the invention, the solid type rubber-based pressure-sensitive adhesive compositions which are solventless and nonaqueous are used, and they are applied on the substrates with heating, thereby being able to exhibit well-balanced adhesive characteristics satisfying both the adhesive strength and the high-temperature holding power without requiring such a drying process as in Comparative Example 2.

In contrast, Comparative Example 2 using the organic solvent requires the drying process, and Comparative Examples 1, 3 and 4 using no crosslinking agent result in the significantly inferior high-temperature holding power.

While the invention has been described in detail with reference to specific embodiments thereof, it will be apparent to one skilled in the art that various changes and modifications can be made therein without departing from the spirit and scope thereof.

Incidentally, this application is based on Japanese Patent Application No. 2006-183161 filed on Jul. 3, 2006 and Japanese Patent Application No. 2007-164320 filed on Jun. 21, 2007, which are hereby incorporated by reference in their entirety.

Further, all references cited herein are incorporated in their entirety.

Industrial Applicability

The rubber-based pressure-sensitive adhesive composition of the invention includes the acrylic rubber as the base component and is solid at ordinary temperatures. Therefore, the pressure-sensitive adhesive sheet excellent in heat resistance and durability and satisfying adhesive strength and high-temperature holding power can be produced by crosslinking treatment of such pressure-sensitive adhesive composition. Further, it is softened by heating to be easily formable. Accordingly, coating on the substrate is possible without using any organic solvent or water, the adhesive thickness thereof can be arbitrarily set, and further, no drying process is required after the coating on the substrate because of no use of organic solvent or water, which can contribute to saving of energy and is also desirable for the global environment.

The invention claimed is:

1. A solid type rubber-based pressure-sensitive adhesive composition, which is prepared by adding a tackifier, a softener, and an isocyanate-based crosslinking agent reactable with active hydrogen into an acrylic rubber to thereby obtain a solventless and nonaqueous pressure-sensitive adhesive composition,
   wherein the acrylic rubber is a rubbery elastomer obtained by copolymerizing copolymerization components comprising butyl acrylate, ethyl acrylate and a monomer having an active hydrogen-containing functional group, by emulsion polymerization, and
   wherein the acrylic rubber has a Mooney viscosity ($ML_{1+4}$, 100° C.) of 28 to 65.

2. The solid type rubber-based pressure-sensitive adhesive composition according to claim 1, wherein said composition comprises 5 to 150 parts by weight of the tackifier, 5 to 80 parts by weight of the softener, and 0.1 to 20 parts by weight of the isocyanate-based crosslinking agent, based on 100 parts by weight of the acrylic rubber.

3. A pressure-sensitive adhesive sheet comprising a substrate and a layer comprising the solid type rubber-based pressure-sensitive adhesive composition according to claim 1, the layer being provided on the substrate.

4. A method for producing a solid type rubber-based pressure-sensitive adhesive composition, said method comprising:
   adding a tackifier, a softener and an isocyanate-based crosslinking agent reactable with active hydrogen to an acrylic rubber, followed by kneading them, thereby producing a solventless and nonaqueous pressure-sensitive adhesive composition, wherein the acrylic rubber is a rubbery elastomer obtained by copolymerizing copolymerization components comprising butyl acrylate, ethyl acrylate and a monomer having an active hydrogen-containing functional group, by emulsion polymerization, and wherein the acrylic rubber has a Mooney viscosity ($ML_{1+4}$, 100° C.) of 28 to 65.

5. The method for producing a solid type rubber-based pressure-sensitive adhesive composition according to claim 4, wherein said composition comprises 5 to 150 parts by weight of the tackifier, 5 to 80 parts by weight of the softener, and 0.1 to 20 parts by weight of the isocyanate-based crosslinking agent, based on 100 parts by weight of the acrylic rubber.

6. A method for producing a pressure-sensitive adhesive sheet, said method comprising applying the solid type rubber-based pressure-sensitive adhesive composition produced by the method according to claim 4 on a substrate under heating.

* * * * *